Nov. 19, 1946.  L. KERIAN  2,411,274
ROLLER GAUGE SORTING MACHINE
Filed March 24, 1944  2 Sheets-Sheet 1
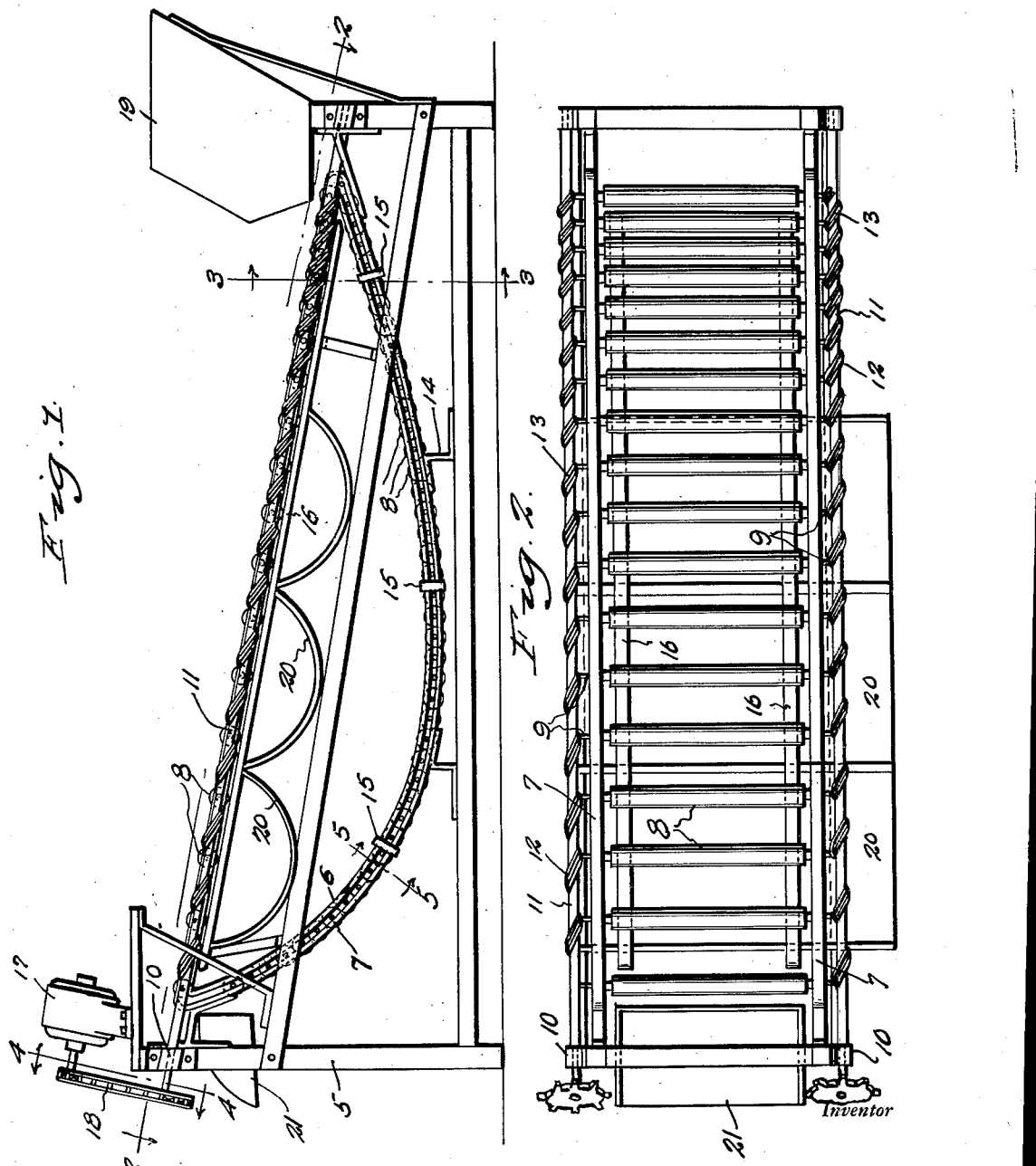
Inventor
Louis Kerian,
By Clarence A. O'Brien
and Harvey B. Jacobson
Attorneys

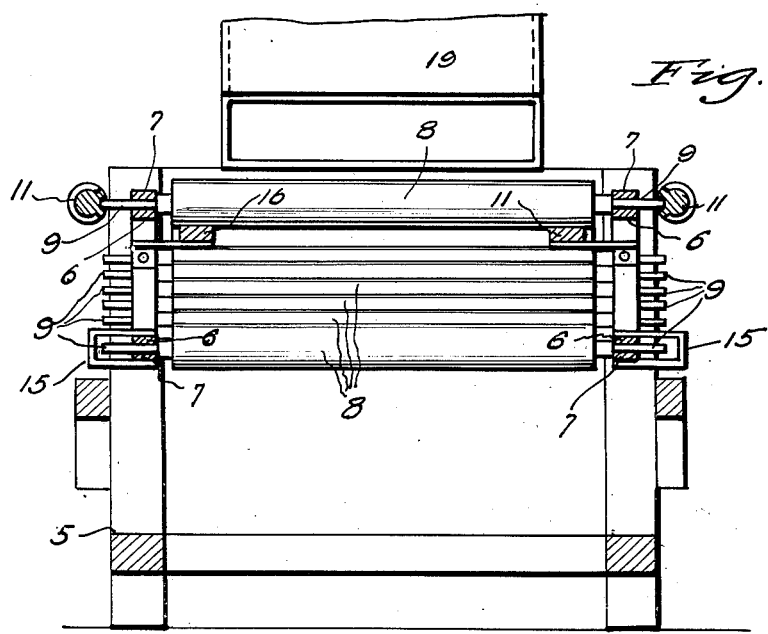
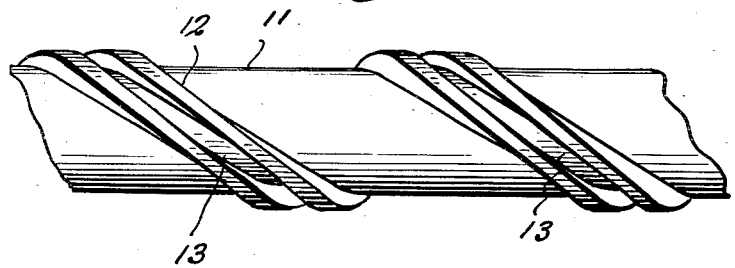
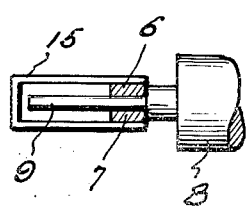
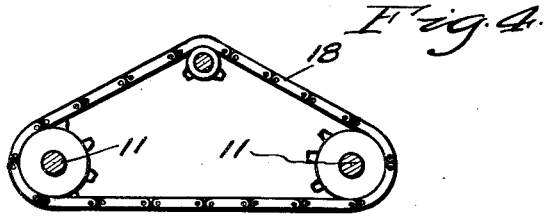

Patented Nov. 19, 1946

2,411,274

UNITED STATES PATENT OFFICE 2,411,274

ROLLER GAUGE SORTING MACHINE

Louis Kerian, Grafton, N. Dak.

Application March 24, 1944, Serial No. 527,948

1 Claim. (Cl. 209—106)

This invention relates to a machine for sorting objects, such as fruits and vegetables, as to size.

The primary object of the invention is to provide a novel machine of the above kind which is comparatively simple and durable in construction, economical and easy to manufacture and use, and highly efficient in operation.

More specifically, the present invention contemplates the provision of a sorting machine including spaced endless guideways affording a horizontally elongated vertical orbital path having a flat upper portion, a continuous series of horizontal rollers disposed transversely of said path and bridging and guided by said guideways, means to cause the rollers to move in the orbital path including means to variably space the rollers while causing them to travel in the flat upper portion of the path so that objects of various sizes will be allowed to pass downwardly between adjacent rollers at different points in the flat upper portion of the path, and means to catch the respective sizes of objects as they are so separated or sorted. The flat upper portion of the path is preferably inclined upwardly and rearwardly from the feed to the delivery end of the machine to afford an arrangement whereby the rollers may gravitate from the discharge end of the upper portion of the path and force the successive rollers into position at the lower receiving end of the horizontal portion of the path by the weight of succeeding rollers. Also, the arrangement is such that the rollers are moved in the horizontal upper portion of the path so as to gradually increase the spacing of the rollers as they move from the receiving or feed end of the machine to the discharge end thereof.

Other objects and features of the invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a side elevational view of a sorting machine constructed in accordance with the present invention.

Figure 2 is a longitudinal section taken on line 2—2 of Figure 1.

Figure 3 is an enlarged transverse section taken on line 3—3 of Figure 1.

Figure 4 is a fragmentary section taken on line 4—4 of Figure 1.

Figure 5 is an enlarged fragmentary sectional detail view taken on line 5—5 of Figure 1.

Figure 6 is an enlarged fragmentary elevational view showing a portion of one of the worm shafts embodied in the means for moving and varying the spacing of the rollers and the upper portion of the path of travel thereof.

Referring in detail to the drawings, 5 indicates a suitable horizontally elongated frame, longitudinally of and within which are mounted a pair of spaced endless guideways, each consisting of uniformly spaced inner and outer guide rails 6 and 7. The guideways are vertically disposed and have flat upper portions which are preferably inclined upwardly and rearwardly from the feed end to the discharge end of the machine, as shown in Figure 1. Thus, the guideways define a vertical, horizontally elongated endless or orbital path having a flat upper portion, and guided by these guideways for movement in this path are an endless series of rollers 8 that bridge the spaces between the guideways and are horizontally disposed transversely of the latter. As shown, the rollers 8 have axial shafts 9 that project at opposite ends of the rollers and extend between and outwardly past the guide rails 6 and 7.

Disposed longitudinally of and journaled in bearings 10 at opposite sides of the frame outwardly of the guideways 6, 7 parallel with the flat upper portions of the latter are worm shafts 11 whose threads 12 gradually increase in pitch from the lower receiving to the higher discharge end of the machine. Also, as more clearly shown in Figure 6, the threads of the shafts 11 are grooved, as at 13, to receive the ends of the roller shafts 9. Accordingly, when the shafts 11 are turned, the rollers 8 at the upper portion of the path or guideways are caused to travel longitudinally of the machine from the lower receiving end to the upper rear discharge end thereof. At the same time, the rollers are given a differential movement so that the spacing thereof is gradually increased as the rollers travel toward the discharge end of the machine. This is illustrated clearly in Figure 2, and it will be apparent that objects of various sizes, within certain limits, will be allowed to pass downwardly between the rollers at different points along the upper portion of the guideways or path. Due to the inclination of the upper portion of the path or guideways, the rollers will fall by gravity at the discharge end of the machine into the downwardly curved lower portion of the guideways or path as the shafts of said rollers disengage from the grooved threads of the worm shafts 11. In this way, the successive rollers are forced upwardly into position for engagement with the worms of shafts 11 at the lower receiving end of the machine, by the weight of the succeeding rollers. However, it will be obvious that positive means may also be provided to feed the rollers into position, in which case the flat upper portion of the path could be horizontal instead of inclined. The guide rails 6 and 7 may have any suitable supporting brackets 14 and spacing brackets 15.

Disposed longitudinally of the frame inwardly of the flat upper portions of the guideways are tracks 16 on which the ends of the rollers 8 are disposed. The outer guide rails 7 hold the rollers against these tracks with sufficient friction to insure rotation of the rollers as they travel upwardly and rearwardly along the tracks 16. The ends of the roller shafts 9 will of course rotatably engage in the grooves 13 of the worm shafts 11 to permit this. The worm shafts 11 may be driven in any suitable manner and by any suitable means, such as a motor 17 mounted upon the rear upper portion of the frame 5 and an endless sprocket chain 18 passing around sprocket wheels fixed on the power shaft of motor 17 and the rear ends of worm shafts 11. A suitable feed hopper 19 may be mounted on the frame at the lower receiving or feeding end thereof, in position to discharge the objects to be sorted upon the rollers 8 at the lower receiving end of the upper or flat path portion.

Suitable transverse chutes 20 may be mounted beneath the flat upper portions of the guideways to receive the respective sizes of objects which pass downwardly between the rollers 8 during the sorting operation. These chutes may extend laterally beyond one side of the machine and incline in this direction to facilitate bagging of the objects as they are sorted. Objects which are of maximum size and may not pass between the rollers 8 at any time will be discharged longitudinally at the discharge end of the machine where a suitable chute 21 may be mounted to receive them for collection in any suitable receptacle.

In operation, the motor 17 is started and a batch of objects is placed in the hopper 19 so that they may feed by gravity onto the rollers 8 at the lower forward receiving end of the machine. As the rollers are moved rearwardly by the worm shafts 11, they are also caused to turn by engagement with the tracks 16 and will be gradually increased in spacing by the form of the threads on said worm shafts 11 which are engaged in the grooves by the ends of the roller shafts 9. Obviously, as the above takes place, objects of various sizes, within predetermined limits, may pass downwardly between adjacent rollers 8 at different points along the horizontal upper portion of the orbital path, and these differently sized objects will be selectively received in different ones of the troughs 20. Remaining still larger objects may pass from the rollers at the discharge end of the machine into the end chute 21. As the rollers disengage from the threads of the shaft 11 at the discharge end of the machine, they will pass downwardly by gravity in contacting relation within the lower downwardly curved portion of the guideways. At the same time, rollers will be constantly fed upwardly into position for engagement with the worm shafts by the weight of the rollers therebehind, thus insuring a continuation of this cycle of operation as long as the motor 17 is used to drive the worm shafts.

From the foregoing description it is believed that the construction and operation, as well as the advantages of the present invention, will be readily understood and appreciated by those skilled in the art. Minor changes in details of construction illustrated and described are contemplated, such as fairly fall within the spirit and scope of the invention as claimed.

What I claim is:

A sorting machine of the character described comprising a horizontally elongated frame, spaced vertical and horizontally elongated guideways mounted longitudinally of and within the frame, said guideways being endless and having flat upper portions and defining a vertical orbital path having a flat upper portion, each guideway including uniformly spaced inner and outer guide rails, a continuous series of rollers disposed transversely of and bridging the space between the guideways, said rollers having shafts whose ends project outwardly between and beyond the guide rails of the guideways, and means to cause movement of the rollers in said path including worm shafts having threads provided with grooves receiving the ends of the roller shafts at the upper portion of the path, said worm shafts being journaled longitudinally of and at opposite sides of the frame parallel with the upper portions of the guideways, the threads of said worm shafts gradually increasing in pitch in a direction corresponding to the direction of movement of the rollers, the upper portions of the guideways being inclined upwardly, the inclination being sufficient to cause the rollers to be fed to the forward part of the machine and the threads of the worm shafts terminating near the rear ends of the upper portions of the guideways whereby the rollers may pass by gravity from the upper portions of the guideways to the lower portions thereof for forcing the rollers successively upwardly into position to engage the threads of the worm shafts at the lower ends of the latter.

LOUIS KERIAN.